(12) United States Patent
Ifrah et al.

(10) Patent No.: US 10,384,954 B2
(45) Date of Patent: *Aug. 20, 2019

(54) COMPOSITION COMPRISING CERIUM OXIDE AND ZIRCONIUM OXIDE HAVING A SPECIFIC POROSITY, PREPARATION METHOD THEREOF AND USE OF SAME IN CATALYSIS

(75) Inventors: Simon Ifrah, La Jarrie (FR); Olivier Larcher, Pennington, NJ (US)

(73) Assignee: RHODIA OPERATIONS, Aubervilliers (FR)

( * ) Notice: Subject to any disclaimer, the term of this patent is extended or adjusted under 35 U.S.C. 154(b) by 400 days.

This patent is subject to a terminal disclaimer.

(21) Appl. No.: 13/384,593

(22) PCT Filed: Jul. 2, 2010

(86) PCT No.: PCT/EP2010/059465
§ 371 (c)(1),
(2), (4) Date: Apr. 6, 2012

(87) PCT Pub. No.: WO2011/006780
PCT Pub. Date: Jan. 20, 2011

(65) Prior Publication Data
US 2012/0189517 A1    Jul. 26, 2012

(30) Foreign Application Priority Data
Jul. 17, 2009    (FR) .................................. 09 03506

(51) Int. Cl.
*B01D 53/94* (2006.01)
*B01J 37/08* (2006.01)
(Continued)

(52) U.S. Cl.
CPC ........ *C01F 17/0018* (2013.01); *B01D 53/945* (2013.01); *B01J 23/002* (2013.01);
(Continued)

(58) Field of Classification Search
CPC .................................................. C01F 17/0018
(Continued)

(56) References Cited

U.S. PATENT DOCUMENTS 5,908,800 A    6/1999    Bonneau et al.
6,133,194 A    10/2000   Cuif et al.
(Continued)

FOREIGN PATENT DOCUMENTS

EP    1621251 A1    2/2006
EP    1 803 686 A1  7/2007
(Continued)

OTHER PUBLICATIONS

Nanostructured CeO2—ZrO2 mixed oxides Roberta Di Monte and Jan Kaspar J. Mater. Chem., vol. 15, pp. 633-648, 2005.*
(Continued)

*Primary Examiner* — Douglas B Call
(74) *Attorney, Agent, or Firm* — Osha Liang LLP

(57) ABSTRACT

A composition including cerium and zirconium oxides, including at least 30 wt.-% cerium oxide is desired. Following calcination at a temperature of 900 DEG C. for 4 hours, the composition has two populations of pores, the diameters of the first population being centered around a value of between 5 nm and 15 nm for a composition including 30% to 65% cerium oxide or between 10 nm and 20 nm for more than 65% cerium oxide and the diameter of the second population being centered around a value of between 45 nm and 65 nm for 30% to 65% cerium oxide or between 60 nm and 100 nm for more than 65% cerium oxide.

24 Claims, 2 Drawing Sheets

Diameter (microns)

Figure 1:
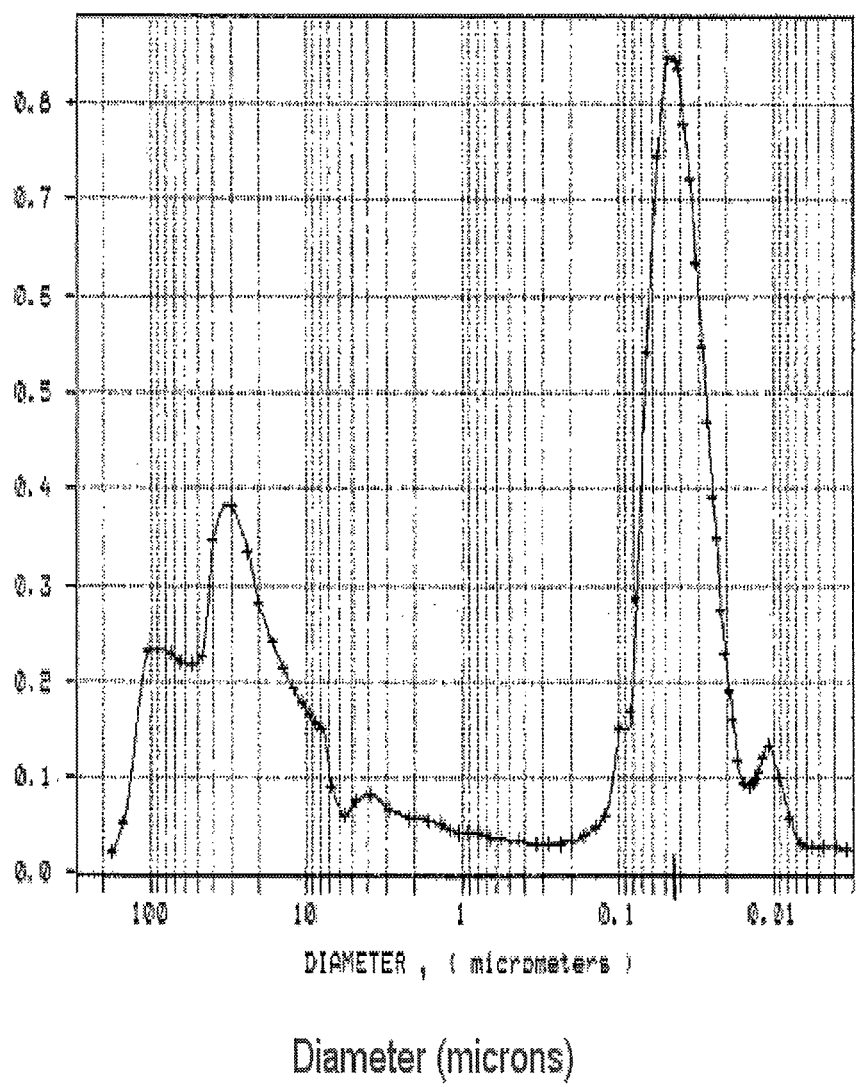

(51) Int. Cl.

| | |
|---|---|
| *B01J 21/06* | (2006.01) |
| *C01F 17/00* | (2006.01) |
| *B01J 23/00* | (2006.01) |
| *B01J 23/10* | (2006.01) |
| *B01J 35/10* | (2006.01) |
| *B01J 37/03* | (2006.01) |
| *C01B 13/36* | (2006.01) |
| *C01G 25/00* | (2006.01) |
| *C01G 25/02* | (2006.01) |

(52) U.S. Cl.
CPC ........... *B01J 23/10* (2013.01); *B01J 35/1009* (2013.01); *B01J 35/109* (2013.01); *B01J 35/1014* (2013.01); *B01J 35/1061* (2013.01); *B01J 37/031* (2013.01); *C01B 13/363* (2013.01); *C01G 25/00* (2013.01); *C01G 25/006* (2013.01); *C01G 25/02* (2013.01); *B01D 2255/206* (2013.01); *B01D 2255/20715* (2013.01); *B01D 2255/9205* (2013.01); *B01J 2523/00* (2013.01); *C01P 2002/50* (2013.01); *C01P 2004/50* (2013.01); *C01P 2004/61* (2013.01); *C01P 2006/12* (2013.01); *C01P 2006/13* (2013.01); *C01P 2006/14* (2013.01); *C01P 2006/16* (2013.01); *C01P 2006/17* (2013.01); *Y02T 10/22* (2013.01)

(58) Field of Classification Search
USPC .................................................. 502/302–304
See application file for complete search history.

(56) References Cited

U.S. PATENT DOCUMENTS

| | | | |
|---|---|---|---|
| 6,214,306 | B1 | 4/2001 | Aubert et al. |
| 6,506,705 | B2* | 1/2003 | Blanchard ................ B01J 23/10 502/300 |
| 2004/0234439 | A1* | 11/2004 | Takeshima ......... B01D 53/9445 423/263 |
| 2006/0018822 | A1* | 1/2006 | Okamoto ............. B01D 53/885 423/608 |
| 2006/0178261 | A1 | 8/2006 | Larcher et al. |
| 2006/0210462 | A1* | 9/2006 | Larcher .................. B01D 53/94 423/213.2 |
| 2006/0263284 | A1 | 11/2006 | Larcher et al. |
| 2007/0264486 | A1* | 11/2007 | Verdier ...................... 428/315.5 |
| 2008/0050593 | A1* | 2/2008 | Okamoto ............... B01J 21/066 428/402 |
| 2008/0187476 | A1 | 8/2008 | Larcher et al. |
| 2008/0312075 | A1 | 12/2008 | Okamoto |
| 2009/0272943 | A1 | 11/2009 | Chartier et al. |
| 2009/0305882 | A1* | 12/2009 | Dahar .................. C04B 38/007 502/303 |

FOREIGN PATENT DOCUMENTS

| | | |
|---|---|---|
| EP | 1 894 620 A1 | 3/2008 |
| EP | 1920830 A1 | 5/2008 |
| WO | 03/037506 A1 | 5/2003 |
| WO | WO 2007/092367 * | 8/2007 |

OTHER PUBLICATIONS

Structural Properties of Zirconia Doped with Some Oxides Abbas et al. Diffusion Fundamentals, v 8:7, p. 1-7, 2008.*

International Search Report (PCT/ISA/210) dated Sep. 6, 2010, by European Patent Office as the International Searching Authority for International Application No. PCT/EP2010/059465.

Roberta Di Monte et al., A rationale for the development of thermally stable nanostructured $CeO_2$—$ZrO_2$-containing mixed oxides, Journal of Rare Earth, vol. 26, No. 2, Apr. 2008, pp. 136-140.

Roberta Di Monte et al., Nanostructured $CeO_2OZrO_2$ mixed oxides, Journal of Materials Chemistry, vol. 15, No. 6, 2005, pp. 633-648.

E. Rohart et al., From Zr-rich to Ce-rich: thermal stability of OSC materials on the whole range of composition, Topics in Catalysis vols. 30/31, Jul. 2004, pp. 417-423.

Sean S-Y. Lin et al., $Co/CeO_2ZrO_2$ catalysts prepared by impregnation and coprecipitation for ethanol steam reforming, Applied Catalysis A: General 366, 2009, pp. 252-261.

EPO Communication of a Notice of Opposition and Request to File Observations dated Jan. 11, 2019, issued by the European Patent Office in corresponding European Application No. 10726996.1, with English machine translation (2 pages).

EPO Notice of Further Oppositions to Opponent(s) dated Jan. 11, 2019, by the European Patent Office in corresponding European Application No. 10726996.1, with English machine translation (4 pages).

Notice of Opposition to a European Patent filed Mar. 21, 2018, by Opponent Neo Chemicals & Oxides (Europe) Ltd., in corresponding European Application No. 10726996.1 (7 pages).

Notice of Opposition filed Dec. 21, 2018, by Opponent Neo Chemicals & Oxides (Europe) Ltd. in corresponding European Application No. 10726996.1 (44 pages).

ASTM Designation: D4284-83 "Standard Test Method for Determining Pore Volume Distribution of Catalysts by Mercury Intrusion Porosimetry"; Annual Book of ASTM Standards, vol. 14.02, published Jan. 1984. [Exhibit D3 to the Notice of Opposition filed Mar. 21, 2018 in corresponding EP-10726996.1] (7 pages).

V. Perrichon, et al., "Thermal stability of a high surface area ceria under reducing atmosphere"; Applied Catalysis A; General 129 (1995), Elsevier Science B.V., SSDI 0926-860X(95)00089-5; pp. 69-82. [Exhibit D5 to the Notice of Opposition filed Mar. 21, 2018 in corresponding EP-10726996.1] (14 pages).

Vicente Sánchez Escribano, et al., "Characterization of cubic ceria-zirconia powders by X-ray diffraction and vibrational and electronic spectroscopy"; Solid State Sciences vol. 5 (2003), doi:10.1016/j.solidstatesciences.2003.07.001, online at: www.sciencedirect.com; pp. 1369-1376. [Exhibit D6 to the Notice of Opposition filed Mar. 21, 2018 in corresponding EP-10726996.1] (8 pages).

"ANSI/ASTM D3663-78 Standard Test Method for Surface Area of Catalysts"; ASTM Committee D-32 on Catalysts, Subcommittee D32.01 on Physical-Chemical Properties, published Jul. 1978 (5 pages) [Exhibit D7 to the Notice of Opposition filed Mar. 21, 2018 in corresponding EP-10726996.1].

S. J. Gregg and K. S. W. Sing, "Adsorption, Surface Area and Porosity", Second Edition; Academic Press Inc. (London) Ltd, (1982), pp. 1-10; ISBN 0-12-300956-1 (19 pages) [Exhibit D8 to the Notice of Opposition filed Mar. 21, 2018 in corresponding EP-10726996.1].

"Third Party Observations on EP 2 454 196 A1" regarding Claim 2 and Claim 4 filed Nov. 3, 2017 (1 page) [Exhibit D11 to the Notice of Opposition filed Mar. 21, 2018 in corresponding EP-10726996.1].

* cited by examiner

Diameter (microns)

COMPOSITION COMPRISING CERIUM OXIDE AND ZIRCONIUM OXIDE HAVING A SPECIFIC POROSITY, PREPARATION METHOD THEREOF AND USE OF SAME IN CATALYSIS

This application claims priority under 35 U.S.C. § 119 of FR 09/03,506, filed Jul. 17, 2009 and is the United States national phase of PCT/EP2010/059465, filed Jul. 2, 2010, and designating the United States (published in the French language on Jan. 20, 2011, as WO 2011/006780 A1; the title and abstract were also published in English), each hereby expressly incorporated by reference in its entirety and each assigned to the assignee hereof.

The present invention relates to a composition based on cerium oxide and zirconium oxide having a specific porosity, to its method of preparation and to its use in catalysis.

At the present time, so-called multifunctional catalysts are used for the treatment of the exhaust gas from internal combustion engines (automobile post combustion catalysis). The term "multifunctional catalysts" is understood to mean catalysts capable of operating not only in oxidation mode, in particular for oxidizing the carbon monoxide and hydrocarbons present in exhaust gas, but also in reduction mode, in particular for reducing the nitrogen oxides also present in this gas (i.e. "three-way" catalysts). Zirconium oxide and cerium oxide presently seem to be two particularly important and useful constituents for catalysts of this type.

Products of this type must have a porosity tailored to their use. Thus, they must have sufficiently large pores to allow good gas diffusion.

However, these same products must also have small pores as it is these pores that contribute to the products having a high enough specific surface area value for them to be able to be used in catalysis.

It is therefore advantageous to find a good compromise between a high surface area value, provided by the small-size pores, and better gas diffusion, provided by the large-size pores.

The object of the invention is to provide a product achieving this compromise.

For this purpose, the composition according to the invention is based on cerium oxide and zirconium oxide containing at least 30 wt % cerium oxide and is characterized in that it has, after calcination at a temperature of 900° C. for 4 hours, two populations of pores, the respective diameters of which are centered, in the first case, around a value of between 5 nm and 15 nm for a composition having a cerium oxide content of between 30% and 65% or a value of between 10 nm and 20 nm for a composition having a cerium oxide content of greater than 65% and, in the second case, around a value of between 45 nm and 65 nm for a composition having a cerium oxide content of between 30% and 65% or a value of between 60 nm and 100 nm for a composition having a cerium oxide content of greater than 65%.

As will be seen later, the compositions of the invention have a significant population of small-size pores that contribute to giving a high specific surface area value, even at high temperature.

Moreover, as another advantage, the compositions of the invention take the form of particles that can be easily deagglomerated and may result in markedly smaller particles, making these compositions particularly useful in catalytic applications.

Figure 2:
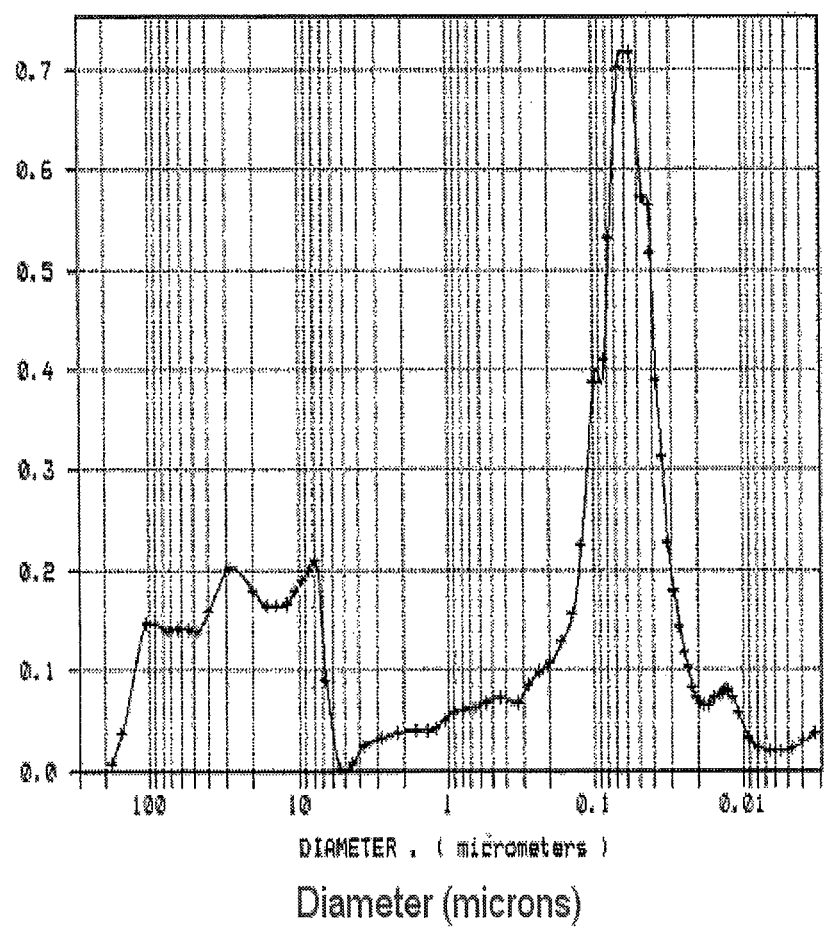

Other features, details and qualities of the invention will become even more fully apparent on reading the following description, given with reference to the appended drawings in which:

FIG. 1 is a pore distribution plot for a composition according to the invention after calcination at 900° C.; and FIG. 2 is a pore distribution plot for a composition according to the invention after calcination at 1000° C.

It is also pointed out in respect of the rest of the description that, unless otherwise indicated, in all the ranges of values or limit values given, the values at the boundaries are inclusive, thus the ranges of values or limit values thus defined therefore cover any value at least equal to or greater than the lower value and/or at most equal to or less than the upper value.

In the present description, the term "rare earths" is understood to mean the elements of the group formed by yttrium and the elements of the Periodic Table having atomic numbers between 57 and 71 inclusive.

The term "specific surface area value" is understood to mean the B.E.T. specific surface area value determined by nitrogen adsorption in accordance with ASTM D 3663 (1978) standard established from the Brunauer-Emmett-Teller method described in "The Journal of the American Chemical Society, 60, 309 (1938)".

Furthermore, the calcinations, after which the surface area values are measured, are calcinations in air.

Unless otherwise indicated, the contents given are the mass content of oxide relative to the total mass of the composition. The cerium oxide is in the form of ceric oxide while the oxides of the other rare earths are expressed as $Ln_2O_3$, Ln denoting the rare earth, with the exception of praseodymium which is expressed as $Pr_6O_{11}$.

The particle size values are obtained by measurements using the laser scattering technique, carried out with an instrument of the Coulter type.

The compositions of the invention are presented according to two embodiments that differ by the nature of their constituents.

According to the first embodiment, these compositions are based on cerium oxide and zirconium oxide. More precisely, they may be compositions that consist or essentially consist of cerium oxide and zirconium oxide. By this is meant that the composition does not contain another oxide of another element that may be a constituent element of this composition or a stabilizer for stabilizing the surface thereof, such as for example a rare earth. However, the composition may contain the impurities normally present with cerium and zirconium.

In the case of the second embodiment of the invention, the compositions are based on cerium oxide, zirconium oxide and at least one oxide of a rare earth other than cerium. In this case, the compositions therefore contain at least three oxides. The rare earth other than cerium may especially be chosen from yttrium, lanthanum, neodymium and praseodymium. Thus, examples according to this second embodiment that may more particularly be mentioned are those based on cerium oxide, zirconium oxide, lanthanum oxide and praseodymium oxide, those based on cerium oxide, zirconium oxide, lanthanum oxide and neodymium oxide and those based on cerium oxide, zirconium oxide, lanthanum oxide and yttrium oxide.

Again in respect of the second embodiment, the invention must be understood as applying to the case in which the composition consists, or essentially consists, of cerium oxide, zirconium oxide and at least one other oxide of another rare earth, the composition then containing no oxide of an element other than the three aforementioned oxides that could be a constituent element of this composition and/or a stabilizer, for stabilizing the surface thereof. In this case, here again the composition may contain the impurities normally present with zirconium and rare earth elements.

Furthermore, and in respect of both the aforementioned embodiments, the compositions of the invention do not contain an element of the noble metal or precious metal type as constituent element. In the context of the present invention and in respect of this type of metal, the term "constituent element" is understood to mean that the metal in question could be present within the composition, in the form of an intimate mixture with the other elements, cerium, zirconium and, as the case may be, the rare earth other than cerium, such an intimate mixture being obtained for example when the noble or precious metal is employed during the actual preparation of the composition. The term "constituent element" applied to said noble or precious metal does not however apply, within the meaning of the present invention, to the case that will be described later in which, for uses in the field of catalysis for example, the noble or precious metal is used as a mixture with a composition of the invention that has been prepared beforehand.

The cerium and zirconium contents of the compositions of the invention, whatever the embodiment, may vary widely, it being understood that the cerium oxide content is at least about 30%. In general, this content is such that the Ce/Zr ratio expressed by mass of oxides of these elements is between 3/10 and 9/10, more particularly between 2.5/2 and 8/2.

In the case of the second embodiment, the content of the oxide of a rare earth other than cerium may be more particularly at most 20 wt %. This content may more particularly be at most 15 wt % and even more particularly at most 10 wt %. Usually, it is also at least 1 wt % and more particularly at least 5 wt %.

According to variants of the invention the cerium oxide content may more particularly be at least 40 wt %, especially in the case of compositions according to the second embodiment, and even more particularly at least 50 wt %.

As mentioned above, the main characteristic of the compositions of the invention is their porosity.

Thus, after calcination at 900° C. for four hours, the compositions of the invention have two very different pore populations that are centered around the values given above.

By way of indication here, and throughout the description, the indicated porosities are measured by mercury intrusion porosimetry in accordance with the ASTM D 4284 (1983) standard (Standard method for determining pore volume distribution of catalysts by mercury intrusion porosimetry).

The porosity measurement method given above makes it possible to obtain, in a known manner, pore size plots giving the pore volume as a function of the pore size (V=f(d), V denoting the pore volume and d denoting the pore diameter). From this pore size plot it is possible to obtain, again in a known manner, a curve (C) giving the derivative of V as a function of d. This curve may have peaks according to the diameter of the pores.

In the context of the invention, the expression "pore population centered around a given value" is understood to mean that the curve (C) has a peak, the maximum of which is located at this given value.

An advantageous feature of the compositions of the invention is the fact that they retain these two pore populations, and therefore the advantages that are associated therewith, even at high temperature, for example even at a temperature above 900° C.

Thus, the compositions of the invention, after calcination at a temperature of 1000° C. for 4 hours, still have two pore populations, one with small-size pores and the other large-size pores. For the first population, the pore diameters are centered around a value of between 8 nm and 20 nm and, for the second population, the diameters are centered around a value of between 30 nm and 70 nm for compositions having a cerium oxide content of between 30% and 50% or between 70 nm and 80 nm for compositions having a cerium oxide content of greater than 50%.

The second pore population is a narrow or monodisperse population, since most of the pores in this population have a size that remains very close to the value about which the corresponding peak is centered. This feature may be measured by the ratio of the width l of the peak at its mid-height to the width L of the peak at its baseline. Thus, the l/L ratio, measured on pore size plots after calcination at 900° C. or 1000° C., is generally at least 30%, more particularly at least 40%.

The compositions of the invention also have a high total pore volume. Thus, the compositions after calcination at 900° C. for 4 hours have a total pore volume of at least 0.6 ml Hg/g. The pore volume may more particularly be at least 0.7 ml Hg/g. At this same temperature, a pore volume of about 0.90 ml Hg/g may be achieved.

The total pore volume still remains high at higher temperature. For example after calcination at a temperature of 1000° C. for 4 hours, the compositions may have a total pore volume of at least 0.5 ml Hg/g, more particularly at least 0.65 ml Hg/g. At this same temperature, a pore volume of about 0.70 ml Hg/g may be achieved.

The total pore volume mentioned here is that which results from the pores having a diameter of between 3 nm and 100 μm.

Another advantageous feature of the invention is that the small-size pores, those of the aforementioned first population, contribute quite a large proportion of the total pore volume. This proportion depends on the temperature at which the composition was calcined—it is higher for compositions calcined at lower temperatures and may generally vary between 5 and 20%.

Thus, this proportion may be between 8 and 12% in the case of a calcination at 900° C. for 4 hours.

The specific porosity of the compositions of the invention creates a high specific surface area thereof.

Thus, the compositions of the invention may have a specific surface area of at least 30 m$^2$/g after calcination at 900° C. for 4 hours, more particularly at least 45 m$^2$/g, for compositions according to the second embodiment. After calcination at the same temperature, surface area values up to about 35 m$^2$/g and up to about 55 m$^2$/g may be obtained for compositions according to the first and second embodiments respectively.

The surface area values may remain high at even higher temperatures. After calcination at 1000° C. for 4 hours, the specific surface area may be at least 15 m$^2$/g for the first embodiment and at least 30 m$^2$/g for compositions according to the second embodiment. After calcination at the same temperature, surface area value up to about 17 m$^2$/g and up to about 45 m$^2$/g may be obtained for compositions according to the first and second embodiments respectively.

The specific surface area of the compositions of the invention may be at least 5 m$^2$/g for the first embodiment and at least 15 m$^2$/g for the compositions according to the second embodiment after calcination for the same time, but at 1100° C.

Finally, after calcination at 1200° C. for 10 hours, a specific surface area of at least 5 m²/g may be obtained.

Another particularly advantageous feature of the compositions of the invention is their ability to be deagglomerated.

The compositions of the invention indeed generally take the form, after their preparation, of particles having a mean size ($d_{50}$) usually between 7 μm and 20 μm.

These particles are in fact agglomerates that can easily be deagglomerated into aggregates of markedly finer mean size, especially at most 3 μm, more particularly at most 2 μm, these consisting of mutually aggregated crystallites.

The term "easily deagglomerable" is understood to mean that agglomerates can be turned into aggregates by a treatment that does not require a large amount of energy, unlike micronising milling or wet milling for example. This treatment may for example be deagglomeration by ultrasound or by putting the composition into suspension.

The fact of obtaining the aggregates easily, that is to say with little energy, is an advantageous feature of the compositions of the invention. Thus in catalytic applications, it is important to easily obtain fine products for use for example as coatings (or wash coats) intended to be deposited on monoliths.

It may also be noted that the compositions of the invention are of good phase purity. These compositions may thus take the form of solid solutions up to high temperatures, that is to say even after calcination at 1100° C., in particular for compositions according to the second embodiment.

The expression "in the form of a solid solution" is understood to mean that these compositions, after calcination at a given temperature, reveal the existence of a single phase which is clearly identifiable from the X-ray diffraction patterns thereof. The nature of this single phase depends on the respective proportions of the various elements of the composition. For compositions relatively rich in cerium, this phase corresponds in fact to a crystal structure of the fluorite type, just like the crystallized ceric oxide $CeO_2$, and the lattice parameters of which are somewhat shifted relative to a pure ceric oxide, thus manifesting the incorporation of zirconium and, where appropriate, that of the other rare earth in the crystal lattice of cerium oxide, and therefore the formation of a true solid solution. In the case of compositions relatively rich in zirconium, the phase corresponds to that of a zirconium oxide crystallized in the tetragonal system, the lattice parameters of which may also be shifted, likewise manifesting the incorporation of cerium and optionally the other element into the crystal lattice of zirconium oxide.

The method of preparing the compositions of the invention will now be described.

This method comprises the following steps:
a first liquid medium is formed, this comprising a zirconium compound, a cerium III compound, sulfate ions, an oxidizing agent and, where appropriate, a compound of a rare earth other than cerium;
the above medium is brought into contact with a base, whereby a precipitate is formed;
the precipitate is separated and washed;
the precipitate resulting from the previous step is resuspended in water and the medium thus formed is subjected to a heat treatment at a temperature of at least 90° C.; and
the precipitate is separated and calcined.

The first step of the method consists in forming a liquid medium, which is preferably water, in which are found, in the necessary amounts, compounds of the various elements that make up the constitution of the composition that is desired to be prepared. These are therefore zirconium and cerium compounds and, in the case of the preparation of a composition according to the second embodiment, compounds of the rare earth(s) other than cerium.

These compounds are preferably soluble compounds, in particular they may be salts of these elements.

These compounds must meet a number of conditions.

The cerium compound is a compound in which cerium is in the III form. Cerium halides, and especially cerium chloride, and cerium nitrate may more particularly be mentioned.

In the case of zirconium, zirconyle nitrate or zirconyle chloride, zirconium sulfate, more particularly a zirconium orthosulfate, or else a basic zirconium sulfate may be used.

As regards the rare earth(s) other than cerium, the compounds may be chosen from nitrates, sulfates, acetates and chlorides.

The starting liquid medium must also contain an oxidizing agent which for example may be hydrogen peroxide.

The starting liquid medium must also contain sulfate ions. These must be present in an amount such that the sulfate ion/Zr atomic ratio is at least 0.5, preferably at least 2.

The sulfate ions may be provided for example by sulfuric acid. They may also be provided at least partly by the zirconium compound when this is a sulfate compound.

The second step of the method consists in bringing the liquid medium prepared in the first step into contact with a base. Products of the hydroxide type may be used as base. Alkaline metal hydroxides or alkaline-earth metal hydroxides may be mentioned. It is also possible to use secondary, tertiary or quaternary amines. However, amines and aqueous ammonia may be preferred insofar as they reduce the risk of pollution by the alkaline or alkaline-earth metal cations. Mention may also be made of urea. The base may more particularly be used in the form of a solution.

According to one particular embodiment of the invention, the contacting between the liquid first medium and the base may take place by introducing the medium into the base, for example by introducing the medium into a reactor that contains the base as stock.

The contacting or the reaction between the liquid first medium and the base may be carried out in a single operation, whether gradually or continuously, and is preferably carried out with stirring. Preferably, it is conducted at a temperature of at least 45° C.

The reaction with the base leads to the formation of a precipitate. The precipitate is separated from the reaction mixture in which it was obtained by any known means, for example by filtration.

The separated precipitate is washed with water to remove the sulfates still present in the precipitate, this washing operation possibly being carried out with water at room temperature or else with hot water, for example at a temperature of at least 50° C.

The next step of the method is the step of heat-treating the precipitate in aqueous medium.

The heat treatment is carried out on a suspension obtained after putting the washed precipitate back into water. The temperature at which the medium is heated is at least 90° C., more particularly at least 100° C. and even more particularly at least 150° C. quite possibly being between 150° C. and 200° C. The heat treatment operation may be carried out by introducing the liquid medium into a hermetically sealed enclosure (a closed reactor of the autoclave type). Under the temperature conditions given above, and in aqueous medium, it may thus be mentioned, by way of illustration, that the pressure in the closed reactor may vary between a value greater than 1 bar ($10^5$ Pa) and 165 bar ($1.65×10^7$ Pa), preferably between 5 bar ($5×10^5$ Pa) and 165 bar ($1.65×10^7$ Pa). The heat treatment may be carried out either in air or in an inert gas atmosphere, preferably in nitrogen.

The heat-treatment time may vary widely, for example between 1 and 48 hours, preferably 1 and 24 hours. Likewise, the rate of the temperature rise is not critical, and thus the fixed reaction temperature may be reached by heating the medium for example for between 30 minutes and four hours, these values being given merely by way of indication.

In the last step of the method according to the invention, the recovered precipitate is separated from the medium in which the heat treatment took place by any suitable means, for example by filtration, and is then calcined. This calcination makes it possible to develop the crystallinity of the formed product and it may also be easily adjusted and/or chosen according to the subsequent use temperature reserved for the composition according to the invention, taking into account that the specific surface area of the product is lower the higher the calcination temperature employed. Such a calcination is generally carried out in air, but a calcination carried out for example in an inert gas or in a controlled (oxidizing or reducing) atmosphere is obviously not excluded.

In practice, the calcination temperature is generally limited to a range of values between 500° C. and 900° C., more particularly between 600° C. and 800° C.

According to one variant, the precipitate may be separated by atomizing the liquid medium in which the heat treatment was carried out.

The term "spray drying" is understood to mean an operating in which the mixture is dried by being sprayed into a hot atmosphere. The spray drying may be carried out by means of any sprayer of a type known per se, for example by a spray nozzle of the showerhead rose or the like. It is also possible to use what are called turbine atomizers. With regard to the various spraying techniques that can be used in the present method, the reader may refer in particular to the fundamental work by Masters entitled "Spray Drying", second edition 1976, published by George Godwin—London.

After spray drying, the dried precipitate thus obtained is calcined under the conditions given above.

The compositions of the invention as described above, or such as those obtained by the method described above, take the form of powders but may possibly undergo a forming operation to make them into granules, beads, cylinders or honeycombs of variable dimensions.

The compositions of the invention may be used as catalysts or catalyst supports. Thus, the invention also relates to catalytic systems comprising the compositions of the invention. For such systems, these compositions may also be applied on any support normally used in the catalysis field, that is to say in particular on thermally inert supports. The support may be chosen from alumina, titanium oxide, cerium oxide, zirconium oxide, silica, spinels, zeolites, silicates, crystalline silicon aluminum phosphates and crystalline aluminum phosphates.

The compositions may also be used in catalytic systems comprising a washcoat having catalytic properties, based on these compositions, said washcoat being applied on a substrate for example of the metallic or ceramic monolith type. The washcoat itself may include a support of the type of those mentioned above and is obtained by mixing the composition with the support so as to form a suspension that can subsequently be deposited on the substrate.

These catalytic systems and more particularly the compositions of the invention may have very many applications. Thus, they are particularly well suited to and therefore usable in catalyzing various reactions such as, for example, the dehydration, hydrosulfuration, hydrodenitrification, desulfuration, hydrodesulfuration, dehydrohalogenation, reforming, steam reforming, cracking, hydrocracking, hydrogenation, dehydrogenation, isomerization, dismutation, oxychlorination and dehydrocyclination of hydrocarbons or other organic compounds, oxidation and/or reduction reactions, the Claus reaction, exhaust gas treatment for internal combustion engines, demetalization, methanation, shift conversion, catalytic oxidation of soot emitted by internal combustion engines, such as diesel or petrol engines operating with a lean mixture. Finally, the catalytic systems and the compositions of the invention may be used as NOx traps or for promoting reduction of NOx even in an oxidizing medium or else as catalysts in a method for decomposing $N_2O$, for example in a nitric acid manufacturing unit or in a static unit.

In the case of these uses in catalysis, the compositions of the invention are employed in combination with precious metals, and thus they act as support for these metals. The nature of the metals and the techniques of incorporating them into the support compositions are well known to those skilled in the art. For example, the metals may be platinum, rhodium, palladium or iridium, and in particular they may be incorporated into the compositions by impregnation.

Among the uses mentioned, the treatment of exhaust gas of internal combustion engines (automotive post combustion catalysis) constitutes one particularly advantageous application. Therefore, the invention also relates to a method of treating the exhaust gas of internal combustion engines, which is characterized in that a catalytic system as described above, or a composition according to the invention and as described above, is used as catalyst.

Example will now be given.

In these examples, the porosities are measured by the technique and according to the standard mentioned above, under the following more particular measurement conditions:
 the specimens subjected to the measurement undergo degassing for 10 hours at 100° C. in a ventilated oven at 100° C., said specimens having a mass of about 300 mg;
 a no. 14 powder penetrometer, the cell of which has a volume of 3.28 cm$^3$, is used with a 0.413 cm$^3$ capillary; and
 the measurement is carried out with a 130° contact angle and a pressure table in intrusion and extrusion mode.

Example 1

This example relates to the preparation of a composition based on zirconium and cerium oxide in respective oxide proportions of 20 wt % and 80 wt %.

The zirconium compound used was zirconium orthosulfate in solution, obtained by dissolving basic zirconium sulfate in sulfuric acid at room temperature and the concentration of which was 253.5 g/l with a density of 1.478, and the cerium compound used was cerium nitrate $Ce(NO_3)_3$ in solution, the concentration of which was 496 g/l with a density of 1.716.

The above compounds were mixed in appropriate amounts for obtaining a final oxide of intended composition, after which 140 ml of 35% $H_2O_2$ was added to this mixture.

The solution obtained was diluted down to a concentration of 100 g/l and then introduced drop by drop into a basic stock, (consisting of 1500 ml of 5 mol/l NH₄OH) with continuous stirring. After semicontinuous precipitation by overflow into a second continuously stirred reactor, the precipitate obtained was filtered and then washed twice in succession with repulping. The concentration in the precipitation reactor was 100 g/l throughout the reaction.

The precipitate obtained in the overflow reactor was resuspended in water with a concentration of 100 g/l and then put in an autoclave for 1 hour at 200° C. with stirring. The precipitate was then calcined in air at 850° C. for two hours.

The composition thus obtained has the following characteristics:

| Specific surface area | |
|---|---|
| 900° C., 4 hours | 30 m²/g |
| 1000° C., 4 hours | 15 m²/g |
| 1100° C., 4 hours | 7 m²/g |
| First pore population | centered at 15 nm (900° C., 4 hours) |
| Second pore population | centered at 80 nm (900° C., 4 hours) |
| 1/L ratio of the peak corresponding to the second pore population | 45% |
| Total porosity | 0.63 ml Hg/g |

After calcination at 1100° C. for 4 hours, the composition was in the form of a pure cubic fluorite crystallographic phase.

Example 2

This example relates to the preparation of composition based on zirconium oxide, cerium oxide, lanthanum oxide and praseodymium oxide in respective proportions by weight of oxides of 30%, 60%, 3% and 7%.

The zirconium and the cerium compounds used were the same as those used in example 1. The lanthanum compound was an La(NO₃)₃ in solution, with a concentration of 454 g/l and a density of 1.687, and the praseodymium compound was in the form of Pr(NO₃)₃ in solution, with a concentration of 500 g/l and a density of 1.732.

The above compounds were mixed in the appropriate amounts for obtaining a final oxide of intended composition, after which 107 ml of H₂O₂ (11.6 mol/l concentration and 1.132 density) were added to this mixture.

The solution obtained was diluted down to a concentration of 100 g/l and then introduced drop by drop into a basic stock (consisting of 1500 ml of 5 mol/l NH₄OH) with continuous stirring. After precipitation and stirring for 1 hour at 50° C., the precipitate obtained was filtered and then washed twice in succession with repulping.

The precipitate obtained was resuspended in water with a concentration of 100 g/l before being placed in an autoclave for 1 hour at 200° C. with stirring. The precipitate was then calcined in air at 850° C. for two hours.

The composition thus obtained had the following characteristics:

| Specific surface area | | |
|---|---|---|
| 900° C., 4 hours | 54 m²/g | |
| 1000° C., 4 hours | 36 m²/g | |
| 1100° C., 4 hours | 19 m²/g | |
| First pore population | centered at 10 nm (900° C., 4 hours) | centered at 15 nm (1000° C., 4 hours) |
| Second pore population | centered at 45 nm (900° C., 4 hours) | centered at 60 nm (1000° C. 4 hours) |
| 1/L ratio of the peak corresponding to second pore population | 42% | 35% |
| Total porosity | 0.85 ml Hg/g | 0.67 ml Hg/g |
| Particle size (D₅₀) (900° C., 4 hours) | before deagglomeration 11 μm | after deagglomeration* 1.6 μm |

*Deagglomeration by ultrasound for 5 minutes with a power of 120 W.

After calcination at 1100° C. for 4 hours, the composition was in the form of a pure cubic fluorite crystallographic phase.

FIG. 1 is the pore size plot for the composition of example 2 after calcination at 900° C. for 4 hours. This clearly shows a first peak, starting from the right-hand side of the plot, centered at around 10 nm and a second peak centered at around 45 nm. FIG. 2 is a pore size plot for the same composition, but after calcination at 1000° C. for 4 hours. There are again the same peaks as in the previous plot but they are shifted to the left, the first being centered at 15 nm and the second at 60 nm.

The invention claimed is:

1. A composition based on cerium oxide and zirconium oxide comprising:
   at least 50 wt % cerium oxide; and
   wherein the composition has, after calcination at temperature of 900° C. for 4 hours, two populations of pores, the respective diameters of which are centered, in a first population, around a value of between 5 nm and 15 nm for a composition having a cerium oxide content of between 50% and 65% or a value of between 10 nm and 20 nm for a composition having a cerium oxide content of greater than 65% and, in a second population, around a value of between 45 nm and 65 nm for a composition having a cerium oxide content of between 50% and 65% or a value of between 60 nm and 100 nm for a composition having a cerium oxide content of greater than 65%.

2. The composition as claimed in claim 1, wherein said composition has a total pore volume of at least 0.6 ml Hg/g.

3. The composition as claimed in claim 1, wherein the pores of the first population contribute a pore volume representing a proportion of the total pore volume of between 8% and 12%.

4. The composition as claimed in claim 1, further comprising at least one oxide of a rare earth element other than cerium.

5. The composition as claimed in claim 4, having a content of a rare earth element, other than cerium, expressed by mass of oxide, of at most 20%.

6. The composition as claimed in claim 1, having a specific surface area of at least 30 m²/g after calcination at 900° C. for 4 hours.

7. The composition as claimed in claim 1, having a specific surface area of at least 5 m²/g after calcination at 1200° C. for 10 hours.

8. The composition as claimed in claim 1, having the form of particles with a mean size of between 7 μm and 20 μm, which can be deagglomerated into particles having a mean size of at most 3 μm.

9. The composition as claimed in claim 1, wherein a Ce/Zr ratio is between 2.5/2 and 8/2.

10. A method of preparing a composition as claimed in claim 1, wherein the method comprises the following steps:
   forming a first liquid medium comprising a zirconium compound, a cerium III compound, sulfate ions in an amount such that the sulfate ion/Zr atomic ratio is at least 0.5, an oxidizing agent and, optionally, a compound of a rare earth other than cerium;
   introducing the first liquid medium into a reactor comprising a base, whereby a precipitate is formed;
   separating and washing the precipitate;
   resuspending the precipitate resulting from the previous step in water and subjecting the resuspended precipitate to a heat treatment at a temperature of at least 90° C.; and
   separating and calcining the precipitate.

11. The method as claimed in claim 10, wherein a zirconium orthosulfate is used as zirconium compound.

12. A catalytic system, comprising a composition as claimed in claim 1.

13. A method of treating an exhaust gas of an internal combustion engine, said method comprising exposing said exhaust gas to a catalytic system as claimed in claim 12.

14. A method of treating an exhaust gas of internal combustion engines, said method comprising exposing said exhaust gas to a composition as claimed in claim 1.

15. A composition based on cerium oxide and zirconium oxide comprising:
   at least 50 wt % cerium oxide; and
   wherein the composition has, after calcination at a temperature of 1000° C. for 4 hours, two populations of pores, the respective diameters of which are centered, in a first population, around a value of between 8 nm and 20 nm and, in a second population, around a value of between 30 nm and 70 nm for a composition having a cerium oxide content of 50% or between 70 run and 80 nm for a composition having a cerium oxide content of greater than 50%.

16. The composition as claimed in claim 15, wherein said composition has a total pore volume of at least 0.5 ml Hg/g.

17. The composition as claimed in claim 15, further comprising at least one oxide of a rare earth other than cerium wherein the at least one oxide is selected from the group consisting of yttrium, lanthanum, neodymium and praseodymium.

18. The composition as claimed in claim 15, wherein the pores of the first population contribute a pore volume representing a proportion of the total pore volume of between 8% and 12%.

19. The composition as claimed in claim 15, having a content of a rare earth other than cerium, expressed by mass of oxide, of at most 20%.

20. The composition as claimed in claim 15, having a specific surface area of at least 5 $m^2/g$ after calcination at 1200° C. for 10 hours.

21. The composition as claimed in claim 15, having the form of particles with a mean size of between 7 μm and 20 μm, which can be deagglomerated into particles having a mean size of at most 3 μm.

22. The composition as claimed in claim 15, wherein a Ce/Zr ratio is between 2.5/2 and 8/2.

23. A catalytic system comprising a composition as claimed in claim 15.

24. A method of treating an exhaust gas of internal combustion engines, said method comprising exposing said exhaust gas to a composition as claimed in claim 15.

* * * * *